(12) United States Patent
Nadarajah (10) Patent No.: US 8,571,027 B2
(45) Date of Patent: Oct. 29, 2013

(54) SYSTEM AND METHOD FOR MULTI-RATE VIDEO DELIVERY USING MULTICAST STREAM

(75) Inventor: Dinesh Nadarajah, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 558 days.

(21) Appl. No.: 11/788,237

(22) Filed: Apr. 18, 2007

(65) Prior Publication Data

US 2008/0259921 A1    Oct. 23, 2008

(51) Int. Cl.
| | |
|---|---|
| H04L 12/28 | (2006.01) |
| H04L 12/56 | (2011.01) |
| H04J 3/26 | (2006.01) |
| H04N 7/173 | (2011.01) |
| H04N 11/02 | (2006.01) |
| H04N 11/04 | (2006.01) |

(52) U.S. Cl.
USPC ............. 370/390; 370/391; 370/432; 725/87; 348/385.1; 348/388.1

(58) Field of Classification Search
USPC ...................... 370/432, 390–391; 725/86–91; 348/385.1–425.4
See application file for complete search history.

(56) References Cited

U.S. PATENT DOCUMENTS

| | | | |
|---|---|---|---|
| 6,351,471 B1 * | 2/2002 | Robinett et al. ............. | 370/468 |
| 6,721,270 B1 | 4/2004 | Mitra et al. | |
| 6,744,785 B2 | 6/2004 | Robinett et al. | |
| 6,985,725 B2 | 1/2006 | Berger | |
| 7,009,971 B2 | 3/2006 | Novaes | |
| 7,072,366 B2 | 7/2006 | Parkkinen et al. | |
| 7,103,669 B2 | 9/2006 | Apostolopoulos | |
| 2001/0006562 A1 * | 7/2001 | Tajime .......................... | 382/251 |
| 2004/0213345 A1 * | 10/2004 | Holcomb et al. ........ | 375/240.03 |
| 2005/0122392 A1 * | 6/2005 | Johansen et al. ........... | 348/14.09 |
| 2005/0265616 A1 * | 12/2005 | Rose ............................ | 382/240 |

OTHER PUBLICATIONS

Wu et al., Scalable Video Coding and Transport over Broad-Band Wireless Networks, Jan. 2001 IEEE, vol. 89, No. 1, pp. 6-20.*
Li, X. , et al., "Video multicast over the internet", *IEEE Network*, 13(2) References Cited: 48 CODEN: IENEET INSPEC Accession No. 6268357 Digital Object Identifier: 10.1109/65.768488 Posted online, (Mar./Apr. 1999) 46-60.

* cited by examiner

*Primary Examiner* — Xavier Szewai Wong
*Assistant Examiner* — Jeremy Costin
(74) *Attorney, Agent, or Firm* — Guntin & Gust, PLC; Ralph Trementozzi (57) ABSTRACT

Systems and methods for multi-rate media data delivery using multiple IP multicast streams are provided. According to example embodiments disclosed herein, the method may include determining a plurality of stream bit rates based on a plurality of demanded bit rates of a plurality of output media data streams and a first algorithm. The method may further include receiving an input media signal and generating a plurality of encoded data streams using the input media signal. The encoded data streams may have encoded bit rates, substantially the same as the stream bit rates. The example method may also include, using a second algorithm and the encoded data streams to generate output data streams at the demanded bit rates. In an example embodiment, the system may comprise a multi-rate encoder and a stream generator, to generate a plurality of encoded streams at the encoded bit rates.

15 Claims, 9 Drawing Sheets

SYSTEM AND METHOD FOR MULTI-RATE VIDEO DELIVERY USING MULTICAST STREAM

TECHNICAL FIELD

The disclosed subject matter relates to the field of network communications, and more particularly to methods, and systems for multi-rate video delivery using multicast streams.

BACKGROUND

In a network system such as Internet Protocol TV (IPTV), a digital television service is delivered over a network structure, using the Internet Protocol. The IPTV content may be delivered by a high-speed data transmission rate internet connection (broadband connection), such as Digital Subscriber Line (DSL) or cable modem. As IPTV evolves, the underlying network architecture provides for delivery of content to multiple devices. These devices may vary between low-powered cell phones; medium-powered handheld game consoles, high-end workstations, and set top boxes. The access networks can also vary with fluctuating bandwidth.

In current implementations of IPTV content delivery, when delivering for multiple devices, the signal from the source may be fed into an encoder to compress the data in order to shrink the required bandwidth burden on the network. In the currently used encoders, an output signal may be generated at a particular bit rate demanded by targeted devices.

When multiple devices with varying capabilities (e.g. cell phones, Standard Definition (SD) television, High Definition (HD) television) are to receive the content, then multiple encoders may be needed to feed the exact same piece of data from the same data source and generate outputs at different bit rates, as required by the targeted receiving devices. The generated multiple data rate outputs have to be carried over transport networks to their final destinations. For example, an HD video source may be used to generate data for four separate devices with bandwidth of 0.3, 2.5, 4, and 9 megabits per second (Mbps). This would require four separate encoders to generate four separate streams transported over the IP infrastructure and then to be delivered to the individual devices. The aggregate bandwidth for the entire data in this case amounts to 15.8 Mbps (9+4+2.5+0.3), which dictates the bandwidth required by the IP infrastructure for delivering the video content to the targeted devices.

BRIEF DESCRIPTION OF THE DRAWINGS

Some embodiments are illustrated by way of example and not limitation in the figures of the accompanying drawings in which.

DETAILED DESCRIPTION

In the last few years, multi-rate video has been delivered to users for multiple devices, such as SDTV, HDTV, personal computers, personal digital assistants (PDAs), cell phones etc. Each device may demand its data stream at its particular bandwidth. As a result, the aggregate bandwidth would be the sum of the individual bandwidth of the devices. At the receiver end, this may not be burdensome on the server, but at head-end, especially when the number of broadcasting channels are large (e.g., in IPTV), the aggregate bandwidth multiplied by the number channels would become prohibitively huge. For this reason, any new idea that could be effective in conserving the bandwidth by lowering the aggregate bandwidth required to feed multi-rate devices, would be greatly advantageous. The invention disclosed below is a step forward in this direction and as described below, may significantly improve the situation. The multicast media data stream-generation system described below generates data streams at lower bit rates than required by user devices, broadcast them at a lower aggregate bandwidth, and combine the generated lower bit rate data streams, at the user site, to create data streams with the same bit rates demanded by the user devices.

In the disclosure below, reference is made to media data. Media data may include, but are not limited to, video or audio data.

In the disclosure below, reference is made to encoded stream bit rate. Encoded stream bit rate may include the bit rate of the encoded data streams generated by a multi-resolution stream generator system discussed in detail below.

In the disclosure below, reference is made to demanded bit rates. Demanded bit rates may include the bit rates that are suited to the bandwidths associated with devices targeted to receive the multicast media data. For example, if the device is a cell phone with a bandwidth of 300 Kilobits per second (Kbps), then the demanded bit rate for that device is less than or equal to 300 Kbps.

In one example embodiment, the method for real-time multicast multi-rate media data delivery may include determining a plurality of encoded stream bit rates, based on a plurality of demanded bit rates of a plurality of output media data streams and a first algorithm. The method may also include receiving an input media signal and generating a plurality of encoded data streams, using the input media signal, an encoded data stream of the plurality of encoded data streams may have an encoded bit rate substantially the same as to a stream bit rate of the plurality of stream bit rates.

The method may further include combining, using a second algorithm, and one or more encoded data streams of the plurality of encoded data streams to generate an output data stream of the plurality of output media data streams.

According to one example embodiment, the system may include a multi-rate encoder to receive an input media signal; the multi-rate encoder may also generate encoded media data, using the input media signal. The multi-rate encoder may deliver the encoded media data to a stream generator. The stream generator may generate a plurality of encoded data streams based on a number N, representing the number of a plurality of output media data streams, and on a plurality of encoded bit rates associated with the plurality of encoded data streams. In an example embodiment, at least one of the encoded bit rates may be less than a demanded bit rate of a user device.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component, which appears in multiple Figures. Signals and connections may be referred to by the same reference number or label, and the actual meaning will be clear from its use in the context of the description.

Figure 1:
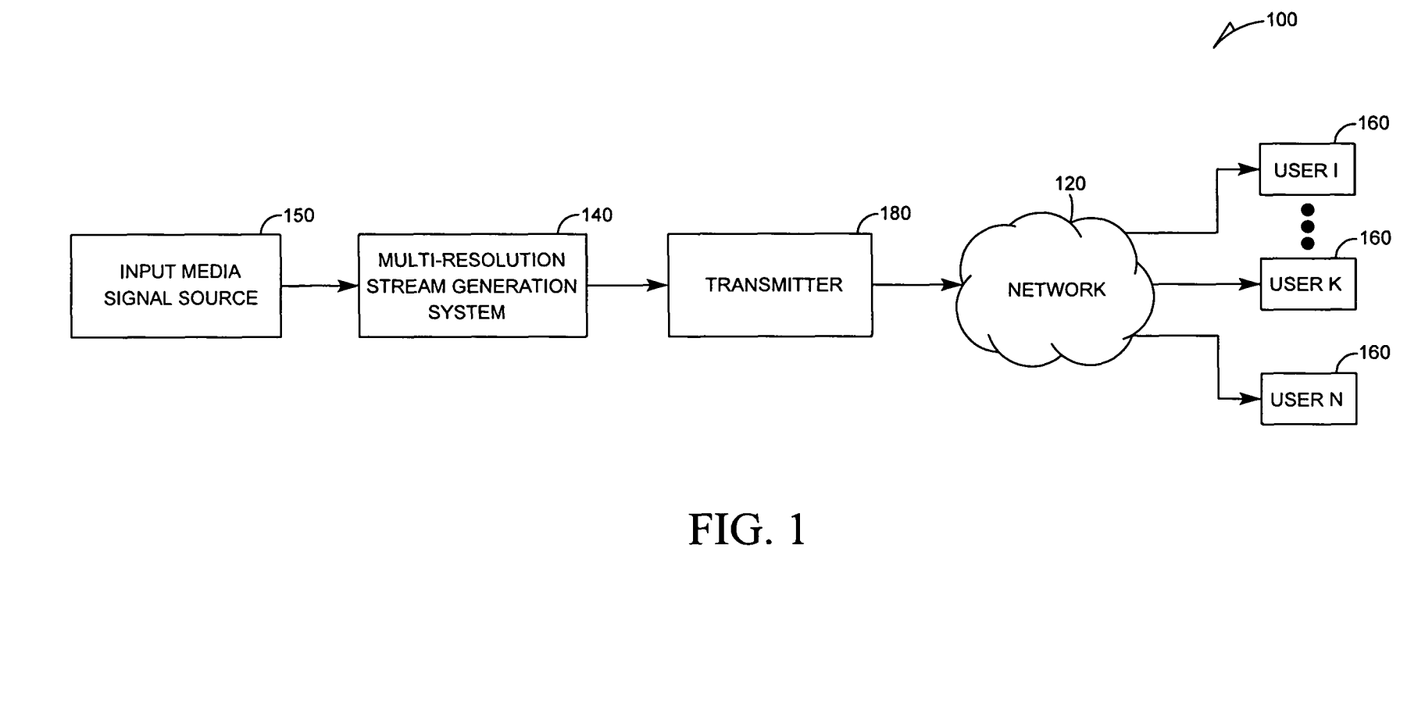
FIG. 1 shows a high level block diagram, illustrating an example embodiment of a system for multi-rate media data delivery, using multicast streams.

FIG. 1 shows a high-level block diagram illustrating an example embodiment of a system 100 for multi-rate media data delivery using multicast streams. According to the example embodiment shown, the multi-resolution stream generator system 140 may receive an input media signal from the input media signal source 150. The multi-resolution stream generator system 140 may generate a plurality of encoded data streams at encoded media data rates. The encoded data streams may then be transmitted by a transmitter 180, via a network 120 to a plurality of user sites 160.

In example embodiments of system 100, the input media signal may include audio or video data (e.g. video data from news networks received by an IPTV head-end). The input media signal may be in one of video formats (e.g., SD or HD formats), or it may be an analog composite video which may need conversion to digital at the head-end. However, in common practice, the head-ends may receive input media signal in serial digital format rather than analog format.

Figure 2:
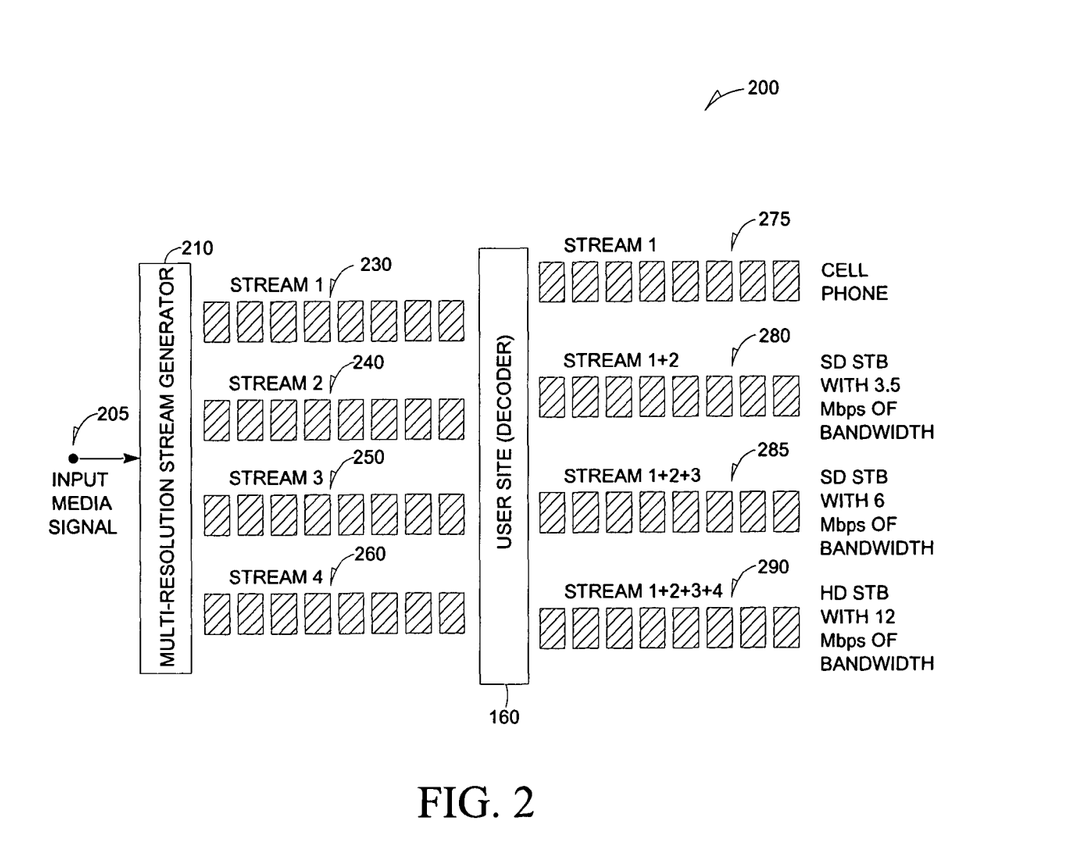
FIG. 2 shows a diagram, illustrating an example embodiment of a system for generating multicast streams using multi-rate resolution stream-generation and decoding.

FIG. 2 shows a diagram illustrating an example embodiment of a system 200 for generating multicast streams using multi-rate resolution stream-generation and decoding. The multi-resolution stream generator 210, described in detail below, may generate encoded data streams 230, 240, 250, and 260 at lower bit rates than are actually demanded by the targeted devices. This may conserve the required bandwidth of the network 120 for broadcasting the streams to targeted devices. Then, the generated encoded media streams 230, 240, 250, and 260 are decoded at a user site 160 into streams 275, 280, 285, and 290, which provide the demanded bit rates required by the receiving devices.

In the example embodiment shown, the receiving devices include a cell phone with a band with of 0.3 Mbps, first and second SD STBs with bandwidths of 3.5 and 6 Mbps, respectively, and a HD STB with a bandwidth of 12 Mbps. If these streams were to be delivered without the claimed multi-resolution stream generator 210, the aggregate bandwidth of 21.8 (0.3+3.5+6+12) Mbps would be required.

However, using the claimed multi-resolution stream generator 210, the streams 230, 240, 250, and 260 may be generated at bit rates of 0.3, 3.2, 2.5, and 6 Mbps, respectively, resulting in an aggregate bandwidth of 12 (0.3+3.2+2.5+6) Mbps. The saving in bandwidth in this example is 9.8 Mbps or 45% of the demanded aggregate bandwidth of 21.8 Mbps. This kind of saving in bandwidth may result in huge savings both at the head-end and the network used to broadcast thousands of channels to millions of user sites (e.g., homes, businesses, etc.)

In the example decoder at user site 160, the first output media data stream 275 is the same as the stream 230 (e.g., at 0.3 Mbps). The second output media data stream 280 is generated, at the user site, by joining the encoded data streams 230 and 240 (e.g., at bit rate of 0.3+3.2=3.5 Mbps). The third output media data stream 285, may be generated by joining the encoded data streams 230, 240, and 250 (e.g., at bit rate of 0.3+3.2+2.5=6 Mbps). Finally, the forth stream 290 may be generated by adding up the encoded data streams 230, 240, 250 and 260 (e.g., at bit rate of 0.3+3.2+6=12 Mbps).

Figure 3:
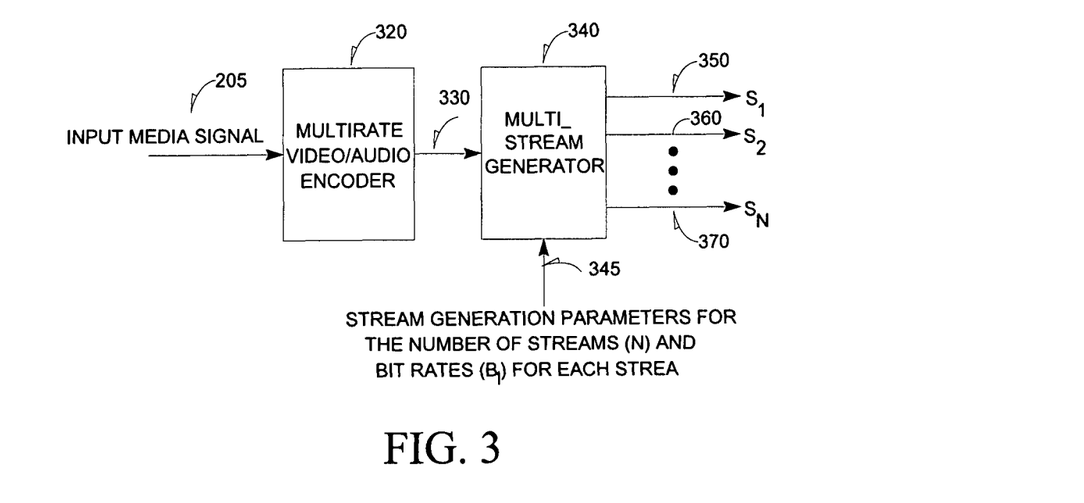
FIG. 3 shows a high level diagram, illustrating an example embodiment of a system for generating multicast streams using multi-resolution encoding and stream generation.

FIG. 3 shows a high-level diagram, illustrating an example embodiment of a system 300 for generating multicast streams using multi-rate resolution encoding and stream generation. The system 300 includes an input media signal 205, a multi-rate encoder 320 (also referred to as video/audio multi-rate encoder), encoded media data 330, a stream generator 340, stream-generation parameters 345, and encoded data streams 350 ($S_1$), 360 ($S_2$),-370 ($S_N$).

The input media signal 205 may be provided by a media data source such as a media broadcasting service (e.g. Cable News Network (CNN), American Broadcasting Company (ABC), and Columbia Broadcasting System CBS), etc.). The multi-rate encoder 320 may receive input media data 205 and convert it to an encoded media data 330. The encoded media data 330, as described below with respect to FIG. 5, may be a multi-resolution data stream having a bit rate the same a the bit rate associated with the highest bit rate encoded data stream (e.g., $S_N$).

Figure 5:
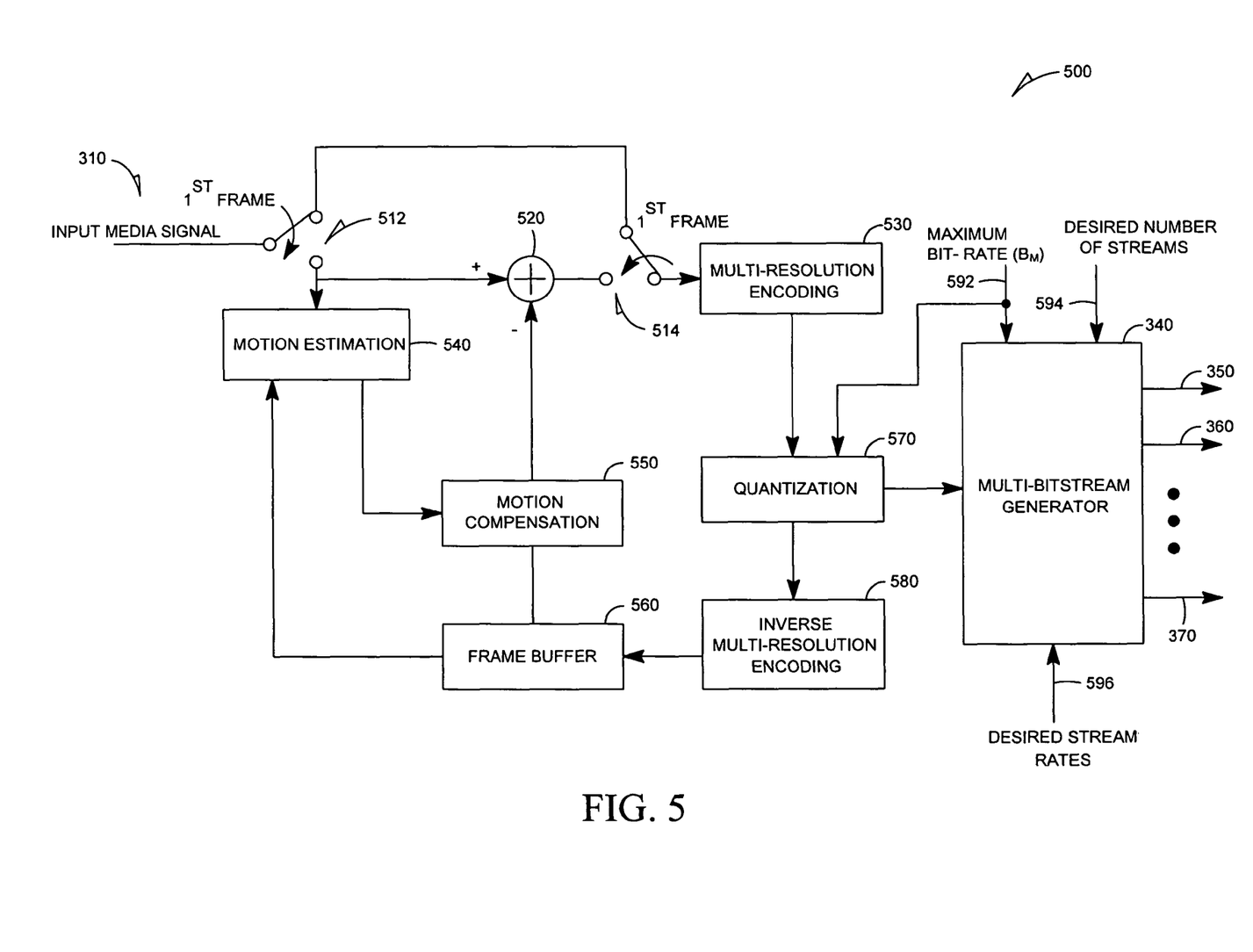
FIG. 5 shows a block diagram, illustrating an example embodiment of a system for generating multicast streams using multi-rate resolution encoding and stream generation.

The stream generator 340, may receive the encoded media data 330 and using the stream-generation parameters 345 (e.g., Maximum bit rate 592, desired number of streams input 594, and desired stream rates 595 shown in FIG. 5), generate the encoded data streams 350 ($S_1$), 360 ($S_2$), to 370 ($S_N$).

The stream generator 340 may use an algorithm (e.g., a first algorithm) to generate the encoded streams $S_2$-$S_N$. According to the algorithm, a $K_{th}$ encoded bit rate EBR (K) associated with a $K_{th}$ encoded data stream of the plurality of encoded data streams (e.g., $S_K$) is calculated from a $K_{th}$ demanded bit rate DBR (K) associated with a $K_{th}$ output media data stream and the encoded bit rates EBR (1) to EBR (K−1) associated, respectively, with a first to a $(K-1)_{th}$ encoded data streams. For $S_1$, the bit rate is the same as the DBR(1) associated with the first output media data stream.

An example algorithm may be expressed by the following formula:

$$EBR(K) = DBR(K) - \Sigma EBR(J) \text{ (for } K>1)$$

Where the summation runs from J=1 to K−1.

Figure 4:
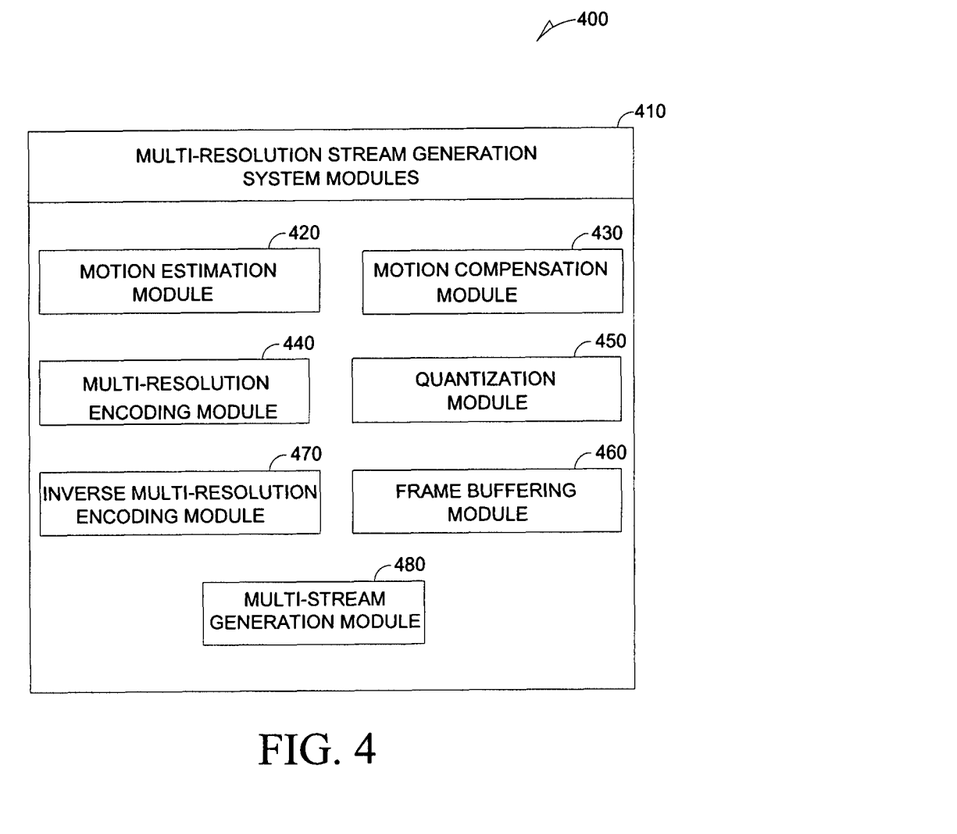
FIG. 4 shows a block diagram, illustrating an example embodiment of a multi-resolution stream-generation system modules.

FIG. 4 shows a block diagram, illustrating an example embodiment 400 of a multi-resolution stream-generation system 410 and its associated modules. The multi-resolution stream-generation system 410 may include a motion estimation module 420, an encoding module 440 (also referred to as multi-resolution encoding module), a motion compensation module 440, a quantization module 450, an inverse multi-resolution encoding module 470, a frame-buffering module 460 and a multi-stream-generation module 480.

In order to understand the function of the motion estimation module 420, one has to realize that a video sequence consists of a series of frames. Some of the frames may not have much different data compared to a previous one (e.g., when the subject is not moving). One of the key elements of many video compression schemes is motion estimation. To achieve video data compression, the temporal redundancy between adjacent frames may be exploited. That is, a frame may be selected as a reference (e.g., the first frame), and subsequent frames may be predicted from the reference using a technique known as motion estimation. The process of video compression using motion estimation is also known as inter-frame coding. Motion estimation is based on the assumption that the objects in the scene may have only translational motion. This assumption may hold as long as there is no camera pan, zoom, changes in luminance, or rotational motion.

When a previous frame is used as a reference, the prediction may be referred to as forward prediction. If the reference frame is a future frame, then the prediction may be referred to as backward prediction. Backward prediction may be used with forward prediction, and this may be referred to as bidirectional prediction. In video compression schemes that rely on inter-frame coding, motion estimation is typically one of the most computationally intensive tasks.

The motion compensation module 430 may provide a predicted frame (P-frame) based on the reference frame, also known as intra-coded frame (I-frame), and the motion vectors, denoting the displacement of the macro-block in the reference frame with respect to the macro-block in the current frame. In an example approach, the motion compensation module 430 may approximate the pixels of the predicted frame by appropriately translated pixels of the reference frame. The frames are usually processed in groups and prediction schemes are described, for example, by IPPPP, which defines the group as an I-frame followed by four P-frames.

The multi-resolution encoding module 440 may be considered as the heart of the multi-resolution stream-generation system 410. In this module, the actual data compression may take place. The multi-resolution encoding module 440 may use either discrete cosine transform (DCT), wavelet compression, or the like, in order to store data in as little space as possible. Both DCT and wavelet are forms of mathematical transforms similar to more well-known discrete Fourier transform (DFT).

Wavelet compression may be perfect, lossless data compression, or a certain loss of quality may be accepted with a lossy data compression. In a lossless compression the exact original data may be reconstructed from the compressed data. The wavelet compression methods, using a wavelet transform, may be better at representing transients, such as percussion sounds in audio, or high-frequency components in two-dimensional images, for example an image of stars on a night sky. This means that the transient elements of a data signal may be represented by a smaller amount of information than would be the case if some other transform, such as the more widespread discrete cosine transform, had been used.

In a wavelet compression, first a wavelet transform may be applied. This produces as many coefficients as there are pixels in the image (that is, there is no compression yet since it is only a transform). These coefficients may then be compressed more easily because the information is statistically concentrated in just a few coefficients. This principle is called transform coding. After that, the coefficients may be quantized, as described in more details below.

DCT is a Fourier-related transform similar to the DFT, but it uses only real numbers. DCTs may be equivalent to DFTs of roughly twice the length, operating on real data with even symmetry (since the Fourier transform of a real and even function is real and even), where in some variants the input and/or output data may be shifted by half a sample. The DCT has a strong energy compaction property, because in DCT, most of the signal information tends to be concentrated in a few low-frequency components of the DCT. The DCT may be used for example in JPEG image compression, Motion JPEG (MJPEG), Moving Picture Experts Group (MPEG), and Digital Video (DV) video compression.

As discussed above, the multi-resolution encoding module may produce as many coefficients as there are pixels in the image. These coefficients may then be compressed more readily in the quantization module 450, because the information is statistically concentrated in just a few coefficients.

The quantization module 450, may act to compress the coefficients by, for instance, reducing their numbers. An interesting fact about human eyes, used in image processing, is that human eyes, while being fairly good at distinguishing small differences in brightness over a relatively large area, may not be so good at differentiating the exact strength of a high frequency brightness variation. This fact may allow the quantization module 450 to divide each coefficient in the frequency domain by a constant for that coefficient and then round the result to the nearest integer. This may be considered as the main lossy operation in the whole process of data compression.

The inverse multi-resolution encoding module 470 may reverse the operation of the multi-resolution encoding module 440. This operation may be necessary to reconstruct the reference frame from the compressed data after quantization operation. The reconstructed reference frame, as discussed above, may then be used in the motion compensation process, to create the predicted frame.

The frame-buffering module 460 may be used to save the video data contained in an image frame. The saved information may include a color value and a transparency value for each pixel. The color value may be commonly stored in 1-bit monochrome, 4-bit palettized (a palette may be a subset of the total range of colors supported by the computer graphics system), 8-bit palettized, 16-bit high-color, and 24-bit true-color formats.

The transparency value, also known as alpha channel, may be used to indicate a pixel transparency. For example, a value of 0 may be used to denote a dark pixel and 1 to represent a fully transparent pixel. The total size of the buffer needed may depend on the frame resolution, color depth and palette size.

The final result of the multi-resolution encoding and quantization processes is a compressed multi-resolution data stream, referred to as encoded media data 330, with a bit rate the same as the maximum encoded bit rate. In a multi-resolution multicast system, a plurality of streams at encoded bit rates may be needed. The multi-stream-generation module 480, produces these streams form the encoded media data 330. The encoded data streams may be generated at encoded bit rates. The encoded bit rates are calculated based on the first algorithm described above in paragraphs 34 and 35.

FIG. 5 shows a block diagram, illustrating an example embodiment of a system 500 for generating multicast streams using multi-rate resolution encoding and stream generation. In the example embodiment shown, the system 500 may include a switch 512, a comparator unit 520, a switch 514, a multi-resolution encoding unit 530, a quantization unit 570, an inverse multi-resolution encoding unit 580, a frame buffer 560, a motion compensation unit 550, a motion estimation unit 540, a multi-bit stream generator 340, input media signal 205, Maximum bit rate input ($B_M$) 592, desired number of streams input 594, desired stream rates input 596, and encoded data streams 350, 360, to 370.

The input media signal 205 may be received at the switch 512 in the form of individual frames. In the shown position of contacts of the switches 512 and 514, the first frame may be directly passed to the multi-resolution encoding unit 530. For subsequent frames, the position of contacts of the switches 512 and 514 may change simultaneously. The first frame passes through multi-resolution encoding unit 530 and quantization unit 570, where it is encoded using DCT or wavelet transform and compressed. The compressed first frame is then passed to the frame buffer 560 to be stored and used by the motion compensation unit 550 as the reference frame, in the motion compensation and estimation operations.

For the second frame, the positions of contacts in switches 512 and 514 may be changed, such that the second frame may be passed to the motion estimation unit 540. At motion estimation unit 540, as described above concerning motion estimation module 420, the second frame is compared with the reference frame received from frame buffer 560 to produce motion vectors. Motion vectors may be used to denote the displacement of the macro-blocks in the reference frame with respect to the macro-blocks in the current frame.

At the motion compensation unit 550, as explained in the description of motion compensation module 430, the reference frame stored in the frame buffer 560 and the motion vectors produced by the motion estimation unit 540 are used to create a predicted frame. The predicted frame is then subtracted from the second frame at comparator unit 520. The resulting data may be passed to the multi-resolution encoding unit 530 and then to the quantization unit 570 for encoding and compression as discussed above. The quantization unit 570 may use the Maximum bit rate ($B_M$) input 592 to establish the right bit rate for the encoded media data 330 generated at the output of quantization unit 570. The subsequent frames in a group will pass through the same path as the second frame.

Based on the desired stream rate input 596 (e.g., $B_1$-$B_N$), the desired number of streams input 594 (e.g., N), and the maximum bit rate input 592($B_M$), the multi-stream-generation unit 340, utilizes the encoded media data 330 to generate N encoded data streams (e.g. 350, 360, and 370). The encoded data streams are created at encoded bit rates EBR (1) to EBR (N) calculated based on the first algorithm described in paragraphs 34 and 35.

Figure 6:
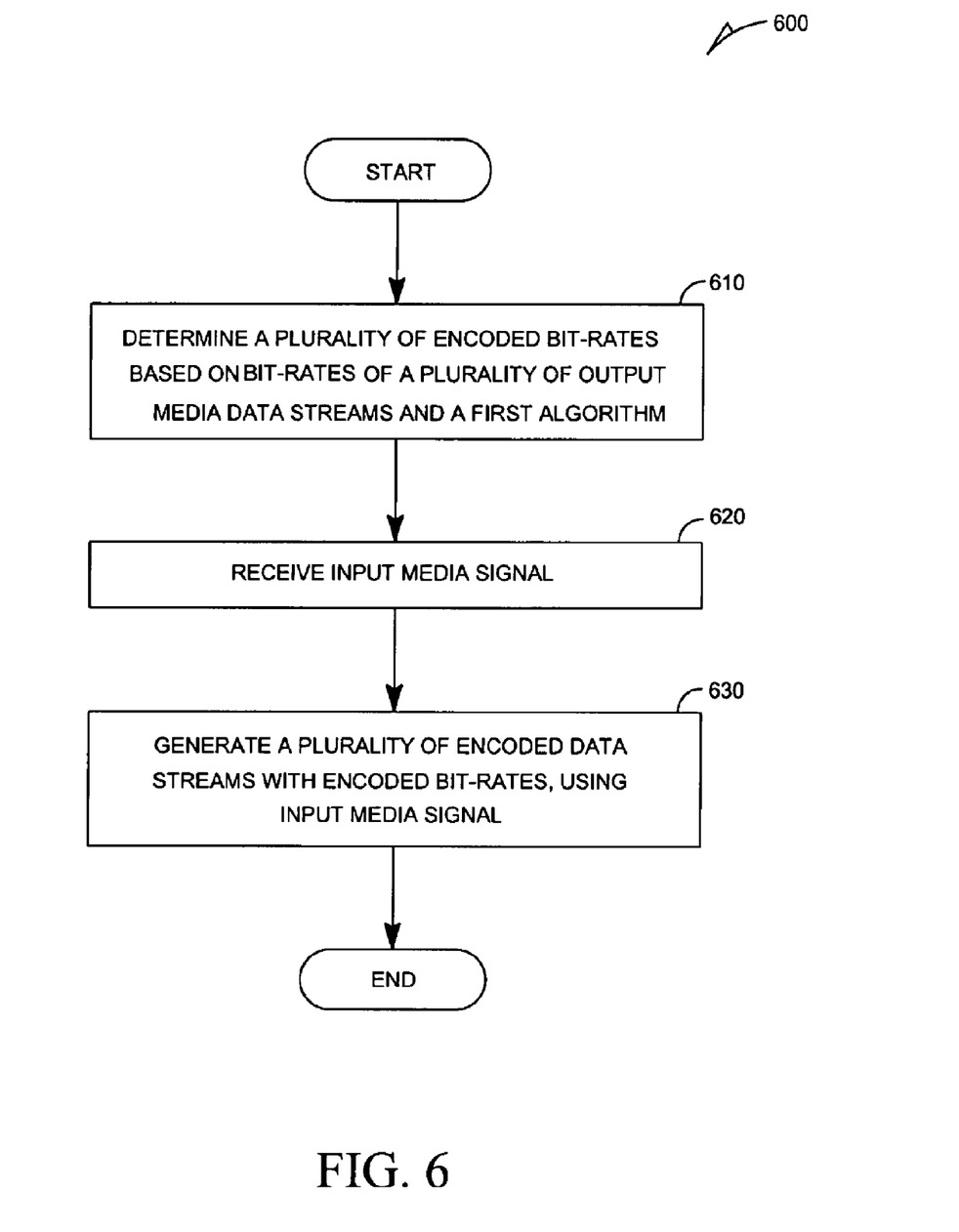
FIG. 6 shows a high level flow diagram, illustrating an example embodiment of a method for generating multicast streams using multi-rate resolution encoding and stream generation.

FIG. 6 shows a high-level flow diagram, illustrating an example embodiment of a method 600 for generating multicast streams using multi-rate resolution encoding and stream generation. The example method starts at operation 610, where the bit rates EBR (1) to EBR(N), associated with the respective encoded data streams $S_1$ to $S_N$ (e.g., 230, 240, 250 and to 260), may be determined using the first algorithm described in paragraph 34 and 35, and based on the bit rates DBR(1) to DBR(N) of the output media data streams (e.g., 275, 280, 285, and 290).

At operation 620, the input media signal 205 may be received from the input media signal source 150, by the multi-resolution stream-generation system 140. At operation 630, the multi-resolution stream-generation system 140 may generate a plurality of encoded data streams (e.g., 230, 240, 250, and 260) at encoded bit rates EBR (1) to EBR(N), derived from the bit rates DBR(1) to DBR(N) of the output media data streams (e.g., 275, 280, 285, and 290).

Figure 7:
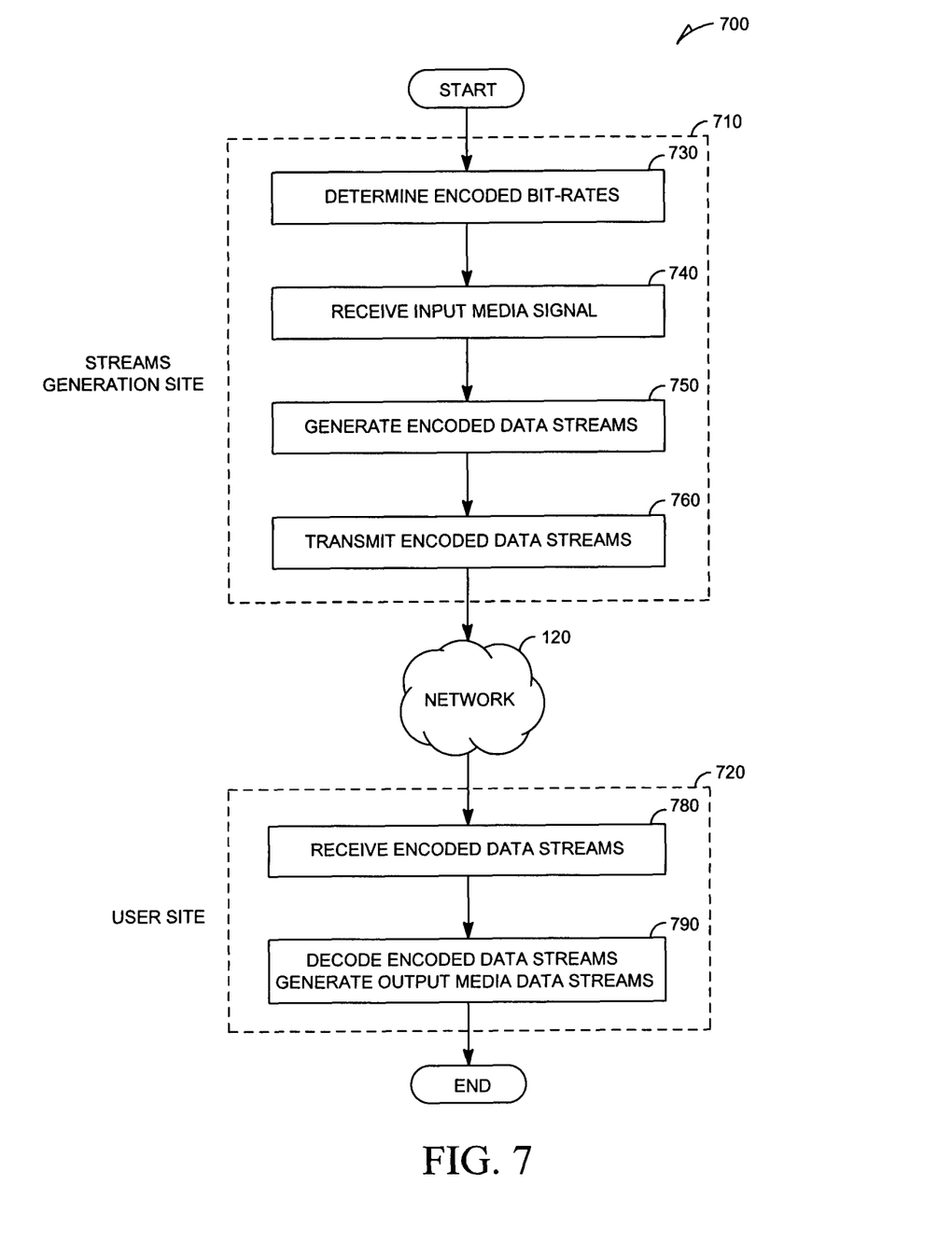
FIG. 7 shows a flow diagram, illustrating an example embodiment of a method for generating multi-resolution multicast streams and delivering the streams at the user sites.

FIG. 7 shows a flow diagram, illustrating an example embodiment of a method 700 for generating multi-resolution multicast streams and delivering the streams to the user sites. The example method 700 describes how the input media signal 205 may be converted to encoded media data streams, broadcast through the network 120 to the user sites 160 and decoded into output media data streams (e.g., 275, 280, 285, and 290).

The process 710, including operations 730, 740, 750, and 760 may be performed at the stream-generation site (e.g., an IPTV head-end), whereas the process 720 including operations 780 and 790 may be performed at the user sites 160.

Operations 730, 740, and 750 may be similar to operations 610, 620 and 630, respectively. At operation 760, the encoded data streams (e.g., 230, 240, 250, and 260) are broadcasted via the transmitter 180 to a network 120. In an example embodiment, the network 120 may be an IPTV video distribution network discussed in detail below (see FIG. 10).

As discussed above, in order to save bandwidth, the encoded data streams broadcasted via the network 120 to the user sites 160, are not at the bit rates demanded by the targeted devices. The encoded data streams need to be decoded (at operation 790) into the output media data streams (e.g., 275, 280, 285, and 290). According to an example embodiment, a decoder may use a second algorithm to convert the N media data streams at bit rates of EBR(1) to EBR(N) into N output media data streams at bit rates of DBR(1) to DBR(N).

In an example embodiment, the second algorithm may be defined by the following formula:

$$DBR(K)=\Sigma EBR(J)$$

Where, the summation runs from J=1 to K. For example, when 4 encoded data streams are generated and broadcasted at bit rates of 0.3, 3.2, 2.5 and 6 Mbps, the respective output data streams may be created at bit rates of 0.3, 3.5 (=0.3+3.2), 6 (=0.3+3.2+2.5), and 12 (=0.3+3.2+2.5+6) Mbps.

Figure 8:
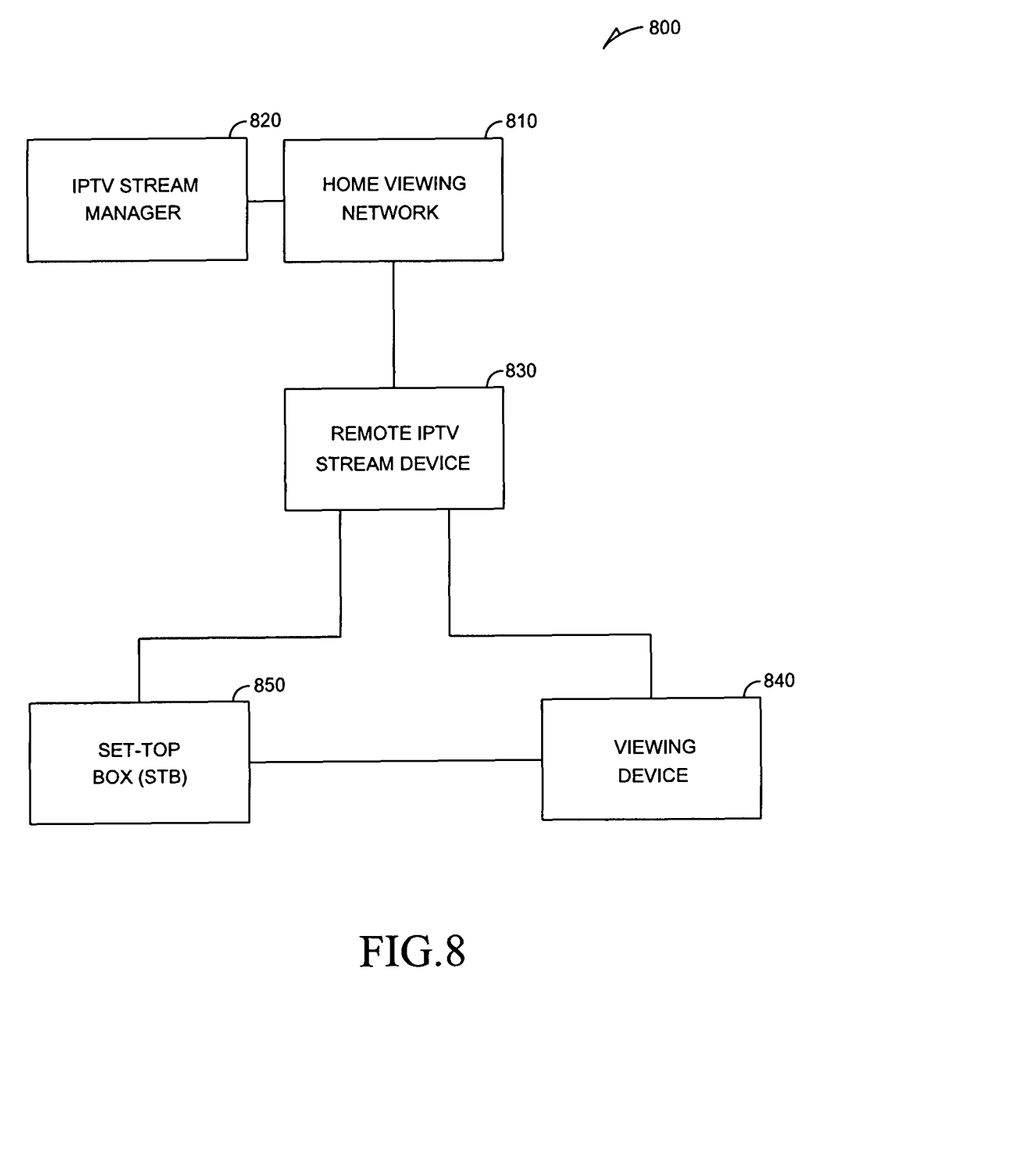
FIG. 8 shows a block diagram, illustrating an example embodiment of a system for generating and delivering IPTV multicast streams.

FIG. 8 shows a block diagram, illustrating an example embodiment of a home based IPTV multicast system 800 for decoding and delivering IPTV multicast streams. The IPTV multicast system 800 is implemented within a machine readable medium and on a plurality of machines within a home viewing network. The IPTV multicast system 800 may include an IPTV stream manager 820 and a plurality of remote IPTV stream devices 830. Each remote IPTV stream device 830 may be interfaced directly to a STB 850 and/or a viewing device 840. The components of the IPTV multicast system 800 may interact within a home viewing network 810.

The IPTV stream manager 820 is the controller of the IPTV stream distribution throughout the home viewing network 810 and effectuates changes in assignment or status of those IPTV streams. The IPTV stream manager 820 may also provide descriptive information or metadata about each IPTV stream within the home viewing network 810 to each remote IPTV stream device 830, such that viewers associated with the viewing devices 840 can make intelligent decisions about IPTV streams within the home viewing network 810 and acquire knowledge about the entire home viewing network 810 and the status and location of each IPTV stream within the home viewing network 810. Changes to the IPTV stream in terms of assignments, recordings, and the like are also effectuated through the IPTV stream manager 820 via actions received from the remote IPTV stream devices 830. The remote IPTV stream devices 830 may receive the actions from selections made by viewers interfaced to the viewing devices 840 and perhaps the STBs 850.

According to an example embodiment, the IPTV stream manager 820 may include a decoder that may be enabled to decode the received encoded data streams at bit rates of EBR (1) to EBR(N) into N output media data streams at bit rates of DBR(1) to DBR(N) to be used by the viewing device 840 or the STBs 850.

In an embodiment, the IPTV stream manager 820 may include an interface that is presented to each of the remote IPTV stream devices 830. The interface is used to present the descriptive information and the actions and is also used to receive selection of the actions from each of the remote IPTV stream devices 830.

The remote IPTV stream devices 830 may act as receivers and transmitters of information between the IPTV stream manager 820 and the STBs 850 or viewing devices 840. The remote IPTV stream devices 830 may present the descriptive information for available IPTV streams within the home viewing network 810 via instruction and data received from the IPTV stream manager 820. The remote IPTV stream devices 830 may also present actions with the descriptive information and receive selections to the actions. The presentations occur on the viewing devices 840 that a viewer watches. The actions to take may be viewed as options presented with the descriptive information to the viewers.

In some embodiments, at least one STB 850 of the home viewing network 810 is directly interfaced to a viewing device 840 and to one of the remote IPTV stream devices 830. In other cases, a STB 850 includes a remote IPTV stream device 830 embedded therein and is capable of directly interacting with the IPTV stream manager 820.

Figure 9:
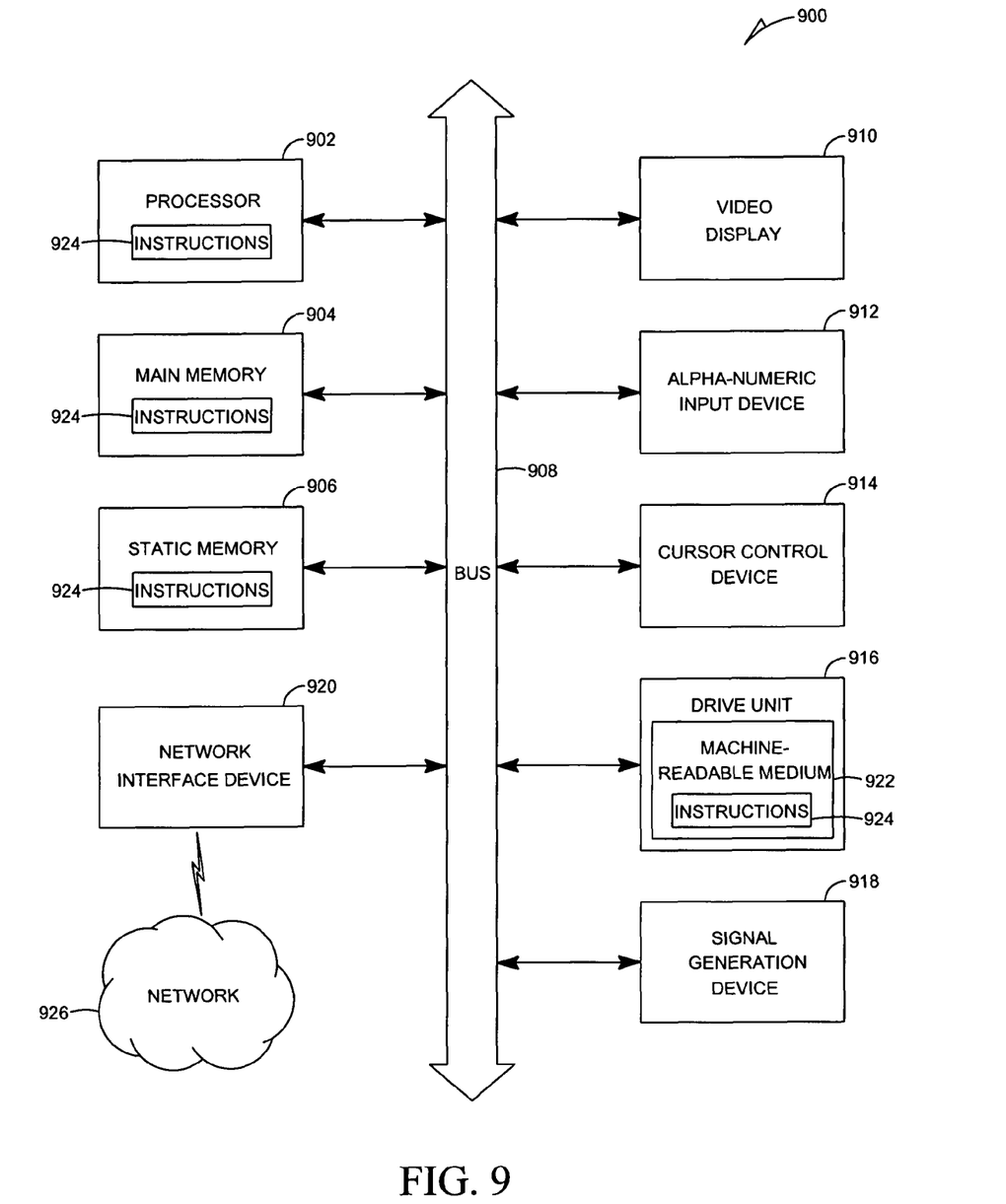
FIG. 9 shows an example machine in the form of a computer system to implement any one or more of the methods and/or systems described herein.

Referring now to FIG. 9, a diagrammatic representation of a machine is shown in the example form of a computer system 900 of a type sufficient for use in any of the example embodiments set forth herein. Computer system 900 may include a set of instructions for causing the machine to perform any one or more of the methodologies discussed herein that may be executed. In alternative embodiments, the machine may operate as a standalone device or may be connected (e.g., networked) to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 may also include an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 may include a machine-readable medium 922 on which is stored one or more sets of instructions and data structures (e.g., software 924) embodied or utilized by any one or more of the methodologies or functions described herein. The software 924 may also reside, completely or at least partially, within the main memory 904, and/or within the processor 902, during execution thereof by the computer system 900. The main memory 904 and the processor 902 may also constitute machine-readable media.

The software 924 may further be transmitted or received over a network 926 via the network interface device 920 utilizing any one of a number of well-known transfer protocols, for example, the hypertext transfer protocol (HTTP). While the machine-readable medium 922 is shown in an example embodiment to be a single medium, the term "machine-readable medium" as an article of manufacture should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methodologies of the disclosed subject matter, or that is capable of storing, or encoding data structures utilized by or associated with such a set of instructions. The term "machine-readable medium" shall accordingly be taken to include, but not be limited to, solid-state memories, and optical and magnetic media.

Figure 10:
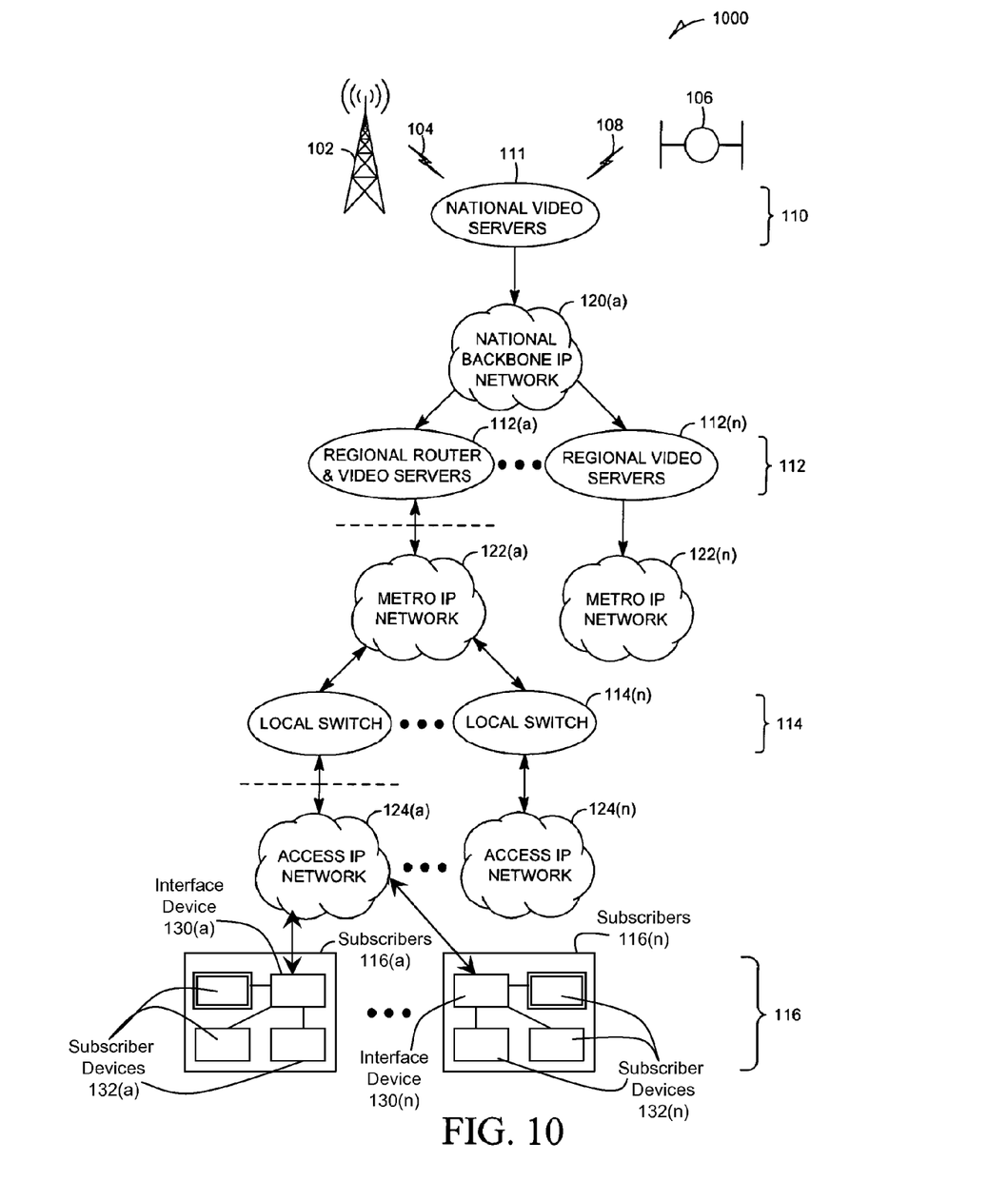
FIG. 10 shows an example embodiment of a network for video content delivery.

FIG. 10 is an example embodiment of a network 1000. In various embodiments, network 1000 is an IPTV video distribution network. Network 1000 is capable of providing advanced services to one or more subscribers. Advanced services include, but are not limited to, providing individualized content to the one or more subscribers coupled to the network. Individualized content includes, but is not limited to, video-on-demand and network based PVR. Advanced services include, but are not limited to, services associated with IPTV.

As illustrated in FIG. 10, network 1000 includes routing and switching elements, including one or more video servers, included in network 1000. Further, one or more different types of servers may be included in network 1000. In various embodiments, the different types of servers may include, but are not limited to, video-acquisition servers (A-servers), video-distribution servers (D-servers), video-on-demand servers (V-servers), as well as interactive host servers.

Network 1000 includes network tiers 110, 112, 114, and 116. Network tier 110 includes one or more national video servers 111. Network tier 110 is coupled to one or more regional routers and video servers 112(a)-112(n) through the national backbone IP network 120(a).

National backbone IP network 120(a) is shown as a single network. However, national backbone IP network 120(a) may include one or a plurality of networks used to connect the national video server 111 with one or more regional routers and video servers 112(a)-112(n). In addition, national backbone IP network 120(a) may not be limited to a particular type of network. The national backbone IP network 120(a) may include any type or types of networks suitable for transmitting the signals present on network 1000.

Network tier 112 may include one or more regional routers and video servers 112(a)-112(n). In one embodiment, not all of the regional routers and video servers 112(a)-112(n) may include routers. For example, regional video server 112(n) is shown as not including a regional router.

Network tier 112 is coupled to network tier 114 through one or more metro IP networks 122(a)-122(n). As illustrated in FIG. 1, regional routers and video server 112(a) is coupled to local switches 114(a)-114(n) through metro IP network 122(a). Metro IP networks 122(a)-122(n) include aggregation and branching points for efficient video distribution.

Connections to local switches from metro IP network 122(n) are not shown in FIG. 10 for the sake of simplicity. However, it would recognize that one or more local switches may also be coupled to metro IP network 122(n) without changing the scope of the invention.

Network tier 114 is coupled to network tier 116 through one or more access IP networks 124(a)-124(n). Network tier 116 includes subscribers 116(a)-116(n). Subscribers 116(a)-116(n) may include interface devices 130(a)-130(n) allowing subscribers 116(a)-116(n) to couple to access IP networks 124(a)-124(n) and to receive signals and transfer requests to and from one or more subscriber devices 132(a)-132(n). In various embodiments, interface devices 130(a)-130(n) are set-top boxes. Subscriber devices 132(a)-132(n) are not limited to any particular types of devices, and may include an IPTV, a computer, a laptop, a video game, a telephone, a cellular phone, or a personal digital assistant. Each subscriber may have one or a plurality of devices coupled to the access IP network 124(a)-124(n). In some examples, the connection may include one or a plurality of wireless connections.

In on example operation, one or more signals 104 may be transmitted from an antenna 102 and received at network tier 110. In another example, one or more signals 108 may be transmitted from a satellite 106 and received at network tier 110. The content of the signals received is encoded, and distributed though the national backbone IP network 120(a) to the regional and local markets represented by network tiers 112, 114, and 116.

At network tier 112, the national content is received. In some examples, local content is received from one or more sources (not shown) and prepared for distribution to the subscribers 116(a)-116(n). Various types of routers and servers are included in the regional routers and video servers 112(a)-112(n) as described above. The routers and servers at network tier 112 are configured so as to provide both the national content, the local content, and any additional content that may be available on the regional routers and video servers 112(a)-112(n) to subscribers 116(a)-116(n) through any of the portions of network 1000 coupling the regional routers and video servers 112(a)-112(n) to the subscribers 116(a)-116(n).

In various embodiments, regional routers and video servers 112(a)-112(n) may receive requests from one or more subscribers 116(a)-116(n). Requests may include a request by a subscriber 116(a)-116(b) to receive the broadcast stream provided on a particular channel. Requests may include a request by a subscriber to receive a video stream available from one or more of the servers included in regional routers and video servers 112(a)-112(n). The requests from subscribers may be responded to by regional routers and video servers 112(a)-112(n) by providing the requested broadcast stream, either as a multi-cast stream or as a uni-cast stream, to the portion of network 1000 coupling the regional routers and video servers 112(a)-112(n) to the requesting subscribers.

In various embodiments, each broadcast stream (broadcast signal including a video stream provided on a channel) passes through the network via IP multicast from a server in the network. In various embodiments, the server providing the IP multicast is an A-server located in a Video-Hubbing Office (VHO), and may provide a multicast signal including the broadcast signal to all subscribers on the network that request the channel providing the broadcast signal. When a subscriber first switches to a new channel, for example, the channel providing a particular broadcast signal, the interface devices 130(a)-130(n) associated with the subscriber may contact one or more D-servers to initiate an instant channel change. As noted above, in various embodiments, the interface device may be a set-top box. In order to provide an instant channel change, the D-server may buffer a certain amount of the broadcast signal, for example several seconds of the broadcast signal, and will provide the buffered broadcast signal to the subscriber changing to the new channel until the subscriber can be handed over to the A-server providing the multicast. In various embodiments, the buffered broadcast signal provided by the D-server may be a uni-cast signal provided to the particular subscriber who recently changed to the channel providing the particular broadcast signal.

In addition, if while tuned to a particular channel a subscriber does not receive some of the data packets included in the broadcast signal, the interface device associated with the subscriber may contact one or more D-servers to recover the lost packets. In this instance, the D-server is adapted to provide lost data packets to the requesting subscriber until the subscriber can again be handed over to the server providing the multicast of the broadcast signal being provided on the particular channel to which the subscriber is tuned. In various embodiments, the lost data packets are provide by the D-server as a uni-cast signal to the particular subscriber that indicated the loss of data packets.

In various embodiments, each subscriber maintains a list of the D-servers to contact when requesting a channel change or when requesting lost data packets associated with any particular broadcast signal provided on a channel of the network. In various embodiments, two or more D-servers may be provided for each channel providing broadcast signals on the network.

At network tier 114, national and local content is received at the local switches 114(a)-114(n). The local switches 114(a)-114(n) may perform aggregation and branching functions before passing the national and local content on to subscribers in network tier 116 through the access IP networks 124(a)-124(n).

Thus, as described above, systems and methods for multi-rate media data delivery, using multiple IP multicast streams are disclosed. While the example embodiments herein are generally illustrated in the environment of an IPTV system, in an alternative embodiment a cable distribution system or satellite distribution system may be used instead. Such a system may or may not use IPTV methodologies. Further, the IPTV may be delivered over-the-air using, for example, broadband wireless telecommunications techniques.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

I claim:

1. A method for media content delivery in a system including a processor, the method comprising:
receiving, by the processor, a plurality of demanded bit rates for a plurality of output media streams suited to a plurality of different bandwidth requirements of a plurality of user devices targeted to receive media content, and an indication of a quantity of encoded data streams of a plurality of encoded data streams from which the plurality of output media streams is obtainable, each encoded data stream of the plurality of encoded data streams corresponding to a respective demanded bit rate of the plurality of demanded bit rates;
determining, by the processor, a respective encoded bit rate for each encoded data stream of the plurality of encoded data streams responsive to the receiving of the plurality of demanded bit rates for the plurality of output media streams and the indication of the quantity of encoded data streams, wherein the plurality of demanded bit rates correspond with the plurality of different bandwidth requirements of the plurality of user devices targeted to receive the media content;

receiving, by the processor, an input media signal;

generating, by the processor, the plurality of encoded data streams from the input media signal, comprising:

applying multi-resolution encoding on a first image frame of the input media signal to produce a multi-resolution encoded first image frame;

applying inverse multi-resolution encoding on the multi-resolution encoded first image frame of the input media signal to produce a reference frame;

applying motion estimation on a second image frame of the input media signal with respect to the reference frame to produce a plurality of motion vectors;

applying motion compensating on the plurality of motion vectors with respect to the reference frame to produce a predicted image frame;

applying multi-resolution encoding on a difference between the second image frame of the input media signal and the predicted image frame;

quantizing the multi-resolution encoded difference, resulting in a multi-resolution encoded data stream; and     generating the plurality of encoded data streams from the multi-resolution encoded data stream, wherein the plurality of output media streams is obtainable based on combining encoded data streams of the plurality of encoded data streams.

2. The method of claim 1, wherein a first respective encoded bit rate of a first encoded data stream of the plurality of encoded data streams is equivalent to a lowest demanded bit rate of the plurality of demanded bit rates of the plurality of output media streams, and remaining respective encoded bit rates of the plurality of encoded data streams are lower than subsequent demanded bit rates of the plurality of demanded bit rates of the plurality of output media streams.

3. The method of claim 1, further comprising transmitting the plurality of encoded data streams from head-end equipment to a plurality of user equipment sites.

4. The method of claim 3, further comprising receiving, at a user equipment site, the plurality of encoded data streams transmitted by the head-end equipment.

5. The method of claim 1, wherein the plurality of encoded data streams are expressed by the following formula: EBR(K)=DBR(K)−ΣEBR (J) (for K>1), wherein a $K_{th}$ encoded data stream bit rate EBR(K) associated with a $K_{th}$ encoded data stream of the plurality of encoded data streams is calculated from a $K_{th}$ demanded bit rate DBR(K) associated with a $K_{th}$ output media data stream of the plurality of output media streams and the encoded data stream bit rates EBR(1) to EBR(K−1) associated respectively with a first to a $(K-1)_{th}$ encoded data stream of the plurality of encoded data streams, and wherein ΣEBR (J) runs from J=1 to K−1.

6. A system comprising:

a multi-rate encoder in communication with a stream generator, the multi-rate encoder operative to receive an input media signal, an indication of a quantity of encoded data streams of a plurality of encoded data streams from which a plurality of output data streams is obtainable, each encoded data stream of a plurality of encoded data streams having a respective encoded bit rate, and a plurality of respective demanded bit rates of the plurality of output data streams, wherein each encoded data stream of the plurality of encoded data streams corresponds to a respective demanded bit rate of the plurality of respective demanded but rates, and to generate a multi-resolution encoded data stream from the input media signal and to deliver the multi-resolution encoded data stream to the stream generator, wherein generating the plurality of encoded data streams comprises:

applying multi-resolution encoding on a first image frame of the input media signal to produce a multi-resolution encoded first image frame;

applying inverse multi-resolution encoding on the multi-resolution encoded first image frame of the input media signal to produce a reference frame;

applying motion estimation on a second image frame of the input media signal with respect to the reference frame to produce a plurality of motion vectors;

applying motion compensating on the plurality of motion vectors with respect to the reference frame to produce a predicted image frame;

applying multi-resolution encoding on a difference between the second image frame of the input media signal and the predicted image frame, resulting in a multi-resolution encoded difference; and     quantizing the multi-resolution encoded difference, resulting in a multi-resolution encoded data stream, and     wherein the stream generator generates the plurality of encoded data streams from the multi-resolution encoded data stream according to respective encoded bit rates of the plurality of encoded data streams, and wherein each of the plurality of output data streams is obtainable at its respective demanded bit rate based on a summation of encoded data streams of the plurality of encoded data streams.

7. The system of claim 6, wherein the plurality of encoded data streams are expressed by a formula: EBR(K)=DBR(K)−ΣEBR (J) (for K>1), wherein a $K_{th}$ encoded data stream bit rate EBR(K) associated with a $K_{th}$ encoded data stream of the plurality of encoded data streams is calculated from a $K_{th}$ respective demanded bit rate DBR(K) associated with a $K_{th}$ respective output data stream of the plurality of output data streams and the encoded data stream bit rates EBR(1) to EBR(K−1) associated respectively with a first to a $(K-1)_{th}$ encoded data stream of the plurality of encoded data streams, and wherein ΣEBR (J) runs from J=1 to K−1.

8. The system of claim 6, wherein the stream generator is configured to enable each of a plurality of user devices to receive a selected one of the plurality of encoded data streams from the stream generator.

9. The system of claim 6, wherein the multi-rate encoder uses a mathematical transform to process the data, the transform comprising one of a direct cosine transform or a wavelet transform.

10. The system of claim 6, further comprising a transmitter to transmit the plurality of encoded data streams from head-end equipment to a plurality of user equipment sites.

11. A method for media content delivery in a system including a processor, the method comprising:

receiving, by the processor, a plurality of demand bit rates for a plurality of output media streams compliant with a plurality of different bandwidth requirements of a plurality of user devices targeted to receive media content;

receiving, by the processor, an indication of a quantity of encoded data streams of a plurality of encoded data streams, wherein each encoded data stream of the plurality of encoded data streams corresponds to a respective demanded bit rate of the plurality of demanded bit rates, wherein a plurality of encoded data streams are generated, by the processor, from an input media signal by:
- applying multi-resolution encoding on a first image frame of the input media signal to produce a multi-resolution encoded first image frame;
- applying inverse multi-resolution encoding on the multi-resolution encoded first image frame of the input media signal to produce a reference frame;
- applying motion estimation on a second image frame of the input media signal with respect to the reference frame to produce a plurality of motion vectors;
- applying motion compensating on the plurality of motion vectors with respect to the reference frame to produce a predicted image frame;
- applying multi-resolution encoding on a difference between the second image frame of the input media signal and the predicted image frame to produce a multi-resolution encoded difference; and
- quantizing the multi-resolution encoded difference, resulting in a multi-resolution encoded data stream; and generating, by the processor, the plurality of the encoded data streams from the multi-resolution encoded data stream according to respective encoded data stream bit rates of the plurality of encoded data streams, and wherein each of the plurality of output media streams is obtainable at it respective bit rate based on a combination of encoded data streams of the plurality of encoded data streams.

12. The method of claim 11, wherein the combination of the encoded data streams of the plurality of encoded data streams is according to the following formula: DBR (K)=$\Sigma$EBR (J), wherein a $K_{th}$ respective demanded bit rate DBR(K) associated with a $K_{th}$ output media stream of the plurality of output media streams is calculated from K encoded bit rates EBR(1) to EBR(K) associated respectively with a first and a $K_{th}$ encoded bit rate of the plurality of encoded data streams and wherein $\Sigma$EBR (J) runs from J=1 to K.

13. A system comprising:
a receiver to receive a plurality of encoded data streams satisfying a plurality of different bandwidth requirements of a plurality of user devices targeted to receive media content, each encoded data stream of the plurality of encoded data streams corresponding to a respective demanded bit rate of a plurality of demanded bit rates and having a plurality of encoded bit rates, wherein the encoded bit rates comprise an encoded bit rate that is less than a demanded bit rate of a user device among the plurality of user devices targeted to receive media content and wherein generating the plurality of encoded data streams comprises:
receiving a plurality of demanded bit rates;
applying multi-resolution encoding on a first image frame of an input media signal to produce a multi-resolution encoded first image frame;
applying inverse multi-resolution encoding on the multi-resolution encoded first image frame of the input media signal to produce a reference frame;
applying motion estimation on a second image frame of the input media signal with respect to the reference frame to produce a plurality of motion vectors;
applying motion compensating on the plurality of motion vectors with respect to the reference frame to produce a predicted image frame;
applying multi-resolution encoding on a difference between the second image frame of the input media signal and the predicted image frame to produce a multi-resolution encoded difference;
quantizing the multi-resolution encoded difference, resulting in a multi-resolution encoded data stream; and
generating a plurality of encoded data streams from the multi-resolution encoded data stream according to respective encoded bit rates of the plurality of encoded data streams; and
a decoder to combine the encoded data streams of the plurality of encoded data streams to generate a plurality of output media streams having a plurality of demanded bit rates, wherein each of the plurality of output media streams is obtainable at its respective demanded bit rate based on a combination of encoded data streams of the plurality of encoded data streams.

14. The system of claim 13, wherein the combination of the encoded data streams of the plurality of encoded data streams is according to a formula: DBR (K)=$\Sigma$EBR (J), wherein a $K_{th}$ respective demanded bit rate DBR(K) associated with a $K_{th}$ output media stream of the plurality of output media streams is calculated from K encoded bit rates EBR(1) to EBR(K) associated respectively with a first and a $K_{th}$ encoded bit rates of the plurality of encoded data streams and wherein $\Sigma$EBR (J) runs from J=1 to K.

15. A non-transitory machine-readable storage medium comprising computer instructions, which when executed by a processor, cause the processor to perform operations comprising:
receiving a plurality of demanded bit rates for a plurality of output media streams compliant with a plurality of different bandwidth requirements of a plurality of user devices targeted to receive media content, and an indication of a quantity of encoded data streams of a plurality of encoded data streams from which the plurality of output media streams is obtainable, wherein each encoded data stream of the plurality of encoded data streams corresponds to a respective demanded bit rate of the plurality of demanded bit rates, and wherein a plurality of demanded bit rates correspond with bandwidth requirements of a plurality of user devices targeted to receive media content;
determining a respective encoded bit rate for each encoded data stream of the plurality of encoded data streams responsive to the receiving of the plurality of demanded bit rates;
receiving an input media signal;
generating the plurality of encoded data streams from the input media signal by:
applying multi-resolution encoding on a first image frame of the input media signal to produce a multi-resolution encoded first image frame;
applying inverse multi-resolution encoding on the multi-resolution encoded first image frame of the input media signal to produce a reference frame;
applying motion estimation on a second image frame of the input media signal with respect to the reference frame to produce a plurality of motion vectors;
applying motion compensating on the plurality of motion vectors with respect to the reference frame to produce a predicted image frame;
applying multi-resolution encoding on a difference between the second image frame of the input media signal and the predicted image frame, resulting in a multi-resolution encoded difference;

quantizing the multi-resolution encoded difference, resulting in a multi-resolution encoded data stream; and generating the plurality of encoded data streams from the multi-resolution encoded data stream, wherein the plurality of output media streams is based on a summation of the plurality of demanded bit rates.

\* \* \* \* \*